United States Patent
Fyanes

[15] 3,704,018
[45] Nov. 28, 1972

[54] BOARD GAME APPARATUS

[72] Inventor: Robert V. Fyanes, 4133 Wagner Avenue, River Forest, Ill. 60176

[22] Filed: Dec. 7, 1970

[21] Appl. No.: 95,773

[52] U.S. Cl. ...273/134 AB, 273/134 AD, 273/134 E, 273/134 G, 273/135 AC, 273/135 D
[51] Int. Cl. .................................................A63f 3/00
[58] Field of Search..............................273/134, 135

[56] References Cited

UNITED STATES PATENTS

| | | | |
|---|---|---|---|
| 1,210,614 | 1/1917 | Dorer | 273/134 E |
| 212,543 | 10/1968 | Tortorici | 273/134 AD UX |
| 114,812 | 5/1939 | Graef | 273/134 AB UX |
| 2,995,374 | 8/1961 | Deatherage | 273/134 AB |

FOREIGN PATENTS OR APPLICATIONS

| | | | |
|---|---|---|---|
| 206,530 | 3/1956 | Australia | 273/134 AD |

*Primary Examiner*—Delbert B. Lowe
*Attorney*—Paul H. Gallagher

[57] ABSTRACT

A game board for an educational game for use by a plurality of players and having a playing area arranged in a circle which includes, in one case, syllables or multi-letter portions of words, and in another case, letters, which in both cases are put together to form words, and to change or add to words previously made; the board includes a series of concentric circles in which the various syllables or letters are arranged, the circles being of different colors, the board also includes a spinner, in the center and a series of numbers repeated circumferentially, the several series being of colors corresponding with those of the circles; and playing pieces incorporated in the board but capable of being punched therefrom for use in putting on the places indicated by the spinner to form words of the syllables or letters depicted on those places.

7 Claims, 5 Drawing Figures

PATENTED NOV 28 1972　　3,704,018

Inventor:
Robert V. Fyanes
By
Paul H. Gallagher
Atty.

BOARD GAME APPARATUS

OBJECTS OF THE INVENTION

A broad object of the invention is to provide a novel game for a plurality of players, including individual areas for the respective players, with player-operated means for indicating portions of the area of the respective player on which portions of words are disposed, and thereby indicating the corresponding portions of words, whereby the players can, in competition, make words of those portions indicated.

Another object is to provide a game of the forgoing character including an arrangement utilizing different colors and numbers for indicating the kind of play to be made by each player, pursuant to the player's "turn at play" as by moving a spinner.

Still another object is to provide a novel educational game, in the use of which words are "built" as by first forming a word and then thereafter building on that same word to form different and/or more complex words, in a series of plays.

DESCRIPTION OF A PREFERRED EMBODIMENT

In the drawings:

FIG. 1 is a face view of a game board made according to the present invention, and including a first form or arrangement of portions of words, from which words are formed;

FIG. 2 is a view similar to FIG. 1, but showing another form of the board, having letters instead of syllables for making up the words;

FIG. 3 is a view corresponding with FIG. 1, but showing only a portion of the material on the board, but also showing positions of playing pieces on different spaces on the board for indicating the building of words;

FIG. 4 is a view corresponding to FIG. 2, but in character similar to FIG. 3, also showing playing pieces on different portions of the board to indicate building of the words; and FIG. 5 is a large scale sectional view taken at line 5—5 of FIG. 1.

Figures 1, 2, 3, 4, 5:
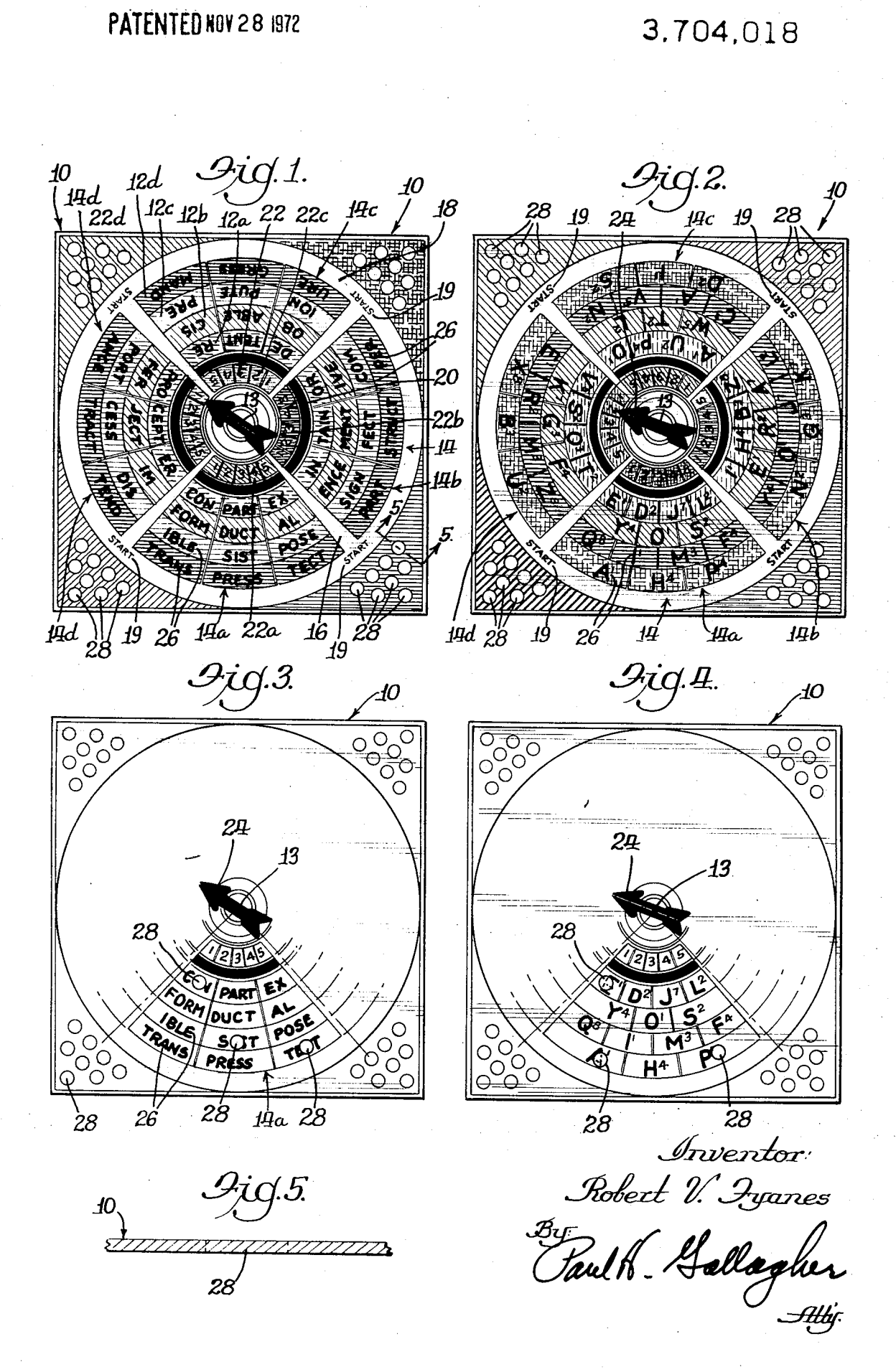

Referring in detail to the drawings, FIGS. 1 and 2 are quite similar, but differ in that in the one case (FIG. 1) the portions of the words are in the form of syllables, and in the other case (FIG. 2) the portions of the words are in the form of letters.

Referring first to FIG. 1, the device includes a board 10 on which are formed a plurality of playing paths 12, in the form of circles or rings of substantial width, individually identified for convenience 12a, 12b, 12c and 12d, concentric about an axis 13. These playing paths or circles 12 are of different colors which in the case of FIG. 1 may arbitrarily be beige, green, light blue and dark blue. The circles are included in an overall playing area 14 which is divided into wedge-shape segments or individual playing areas 14a, 14b, 14c and 14d delimited by radiating spaces or spokes 16 which for convenience may be stark or bare.

Preferably these concentric paths are surrounded by a bordering strip or circle 18 which may be neutral, or white, for example, and in this bordering circle are "-START" indications 19 aligned with the spokes 16 to indicate starting positions for the different players at the corresponding playing areas 14.

Within the playing circles is a line of demarkation 20 which may be black, and within that circle is an indicating circle or ring 22 including a plurality of circumferentially successive indicating areas 22a, 22b, 22c and 22d, in register with corresponding segments 14 of the playing areas. The sections of the circle 22 are respectively colored the same as the different playing paths or rings 14 and each indicating area is divided into a plurality of spaces or sections bearing the numerals 1 to 5. The indicating areas 22 are separated by extensions of the spaces or spokes 16.

Within the indicating circle or ring 22 is a spinner or indicating device 24 having a pointer playing into the numerals in the indicating ring or circle 22.

Each of the rings or circles 12 of the playing areas are divided into circumferentially successive sections or segments bearing portions of words 26 which in the present instance are syllables or multi-letter portions of words. These syllables are such that when placed together in selected and certain arrangements they make complete words, although as will be realized all of them when placed together in random order do not, of course, make such words.

The board 10 includes a plurality of groups of markers 28, one group in each corner for use by one of the players. These markers may be discs formed in the material of the board, and the board scored or perforated so that the player can punch them out. It is also practical to provide detached markers, originally separate from the board.

In the playing of the game, each player in turn spins the indicator or spinner 24. When the indicator stops, the color of the indicating area 22 at which the point stops determines the playing path or circle 12 on which the respective player places his markers 28, i.e. they are placed on the path having the corresponding color, and the number on the space in that particular-colored area of the indicator circle indicates the number of places or spaces the player can move his marker. For example, if it should stop at green, No. 1, then the player puts one of the markers 28 on the green circle one space from the starting point which is the white stripe or spoke 16. Then on that same player's next spin, if it should stop at, for example, green, No. 4, he can place another marker on the green circle at four spaces removed; alternatively, he can move the first marker four spaces from its then position.

The syllables or portions of words on which the markers fall, are considered from the standpoint of forming complete words, and when such a complete word is formed, a score is achieved and the player records that score.

Thus the game includes different paths or rings individually identified by color and each having a plurality of areas for as many players; each path or ring has a plurality of spaces in each of the areas and each of those spaces bears a portion of a word; additionally, the device includes the indicator circle or ring 22 made up of indicating areas of the same colors as the playing paths or rings, and each of those indicative areas includes a plurality of spaces numbered consecutively; additionally, the device includes a spinner which cooperates with the indicator circle for indicating the respective ones of the playing paths or rings, together with the numbers of spaces to be utilized in a play on the respective paths or rings; and finally, separate markers for movement onto the spaces in the playing paths or rings.

FIG. 3 is a view corresponding to FIG. 1, having the same pattern of the paths and circles or rings, although only a portion thereof, and showing some of the markers 28 on different ones of the spaces of the playing paths or rings. This shows the manner in which the different syllables on those spaces may be placed to form ultimate words and to indicate corresponding scores.

FIG. 2 shows the face of a game board very similar to that of FIG. 1, but designed principally for a more adult type of thinking. In FIG. 2, the word parts or portions 26 consist of individual letters rather than syllables or multi-letter portions of words. In the more adult type of playing, the players can utilize more imagination and form a greater variety of words than in the case of predetermined syllables as in the lower-age type of game of FIG. 1.

FIG. 4 corresponds with FIG. 2 as to the type of game, but is similar to FIG. 3 in that it shows markers 28 placed on different ones of the letters 26 as may occur in the playing of the game in forming words from those letters.

Incorporated hereinbelow are two sets of rules for use in connection with the two forms of the game, namely, "RULES FOR THE YOUNGER AGES," applicable to the form of device of FIGS. 1 and 3, and "RULES FOR ADULTS" applicable to the form of FIGS. 2 and 4.

In both cases, namely the game for the younger thinking, and the game for adult thinking, the rules set out hereinbelow show and fully explain the type of utilization of the game and therefore, it is believed that those rules will eliminate or at least minimize the detail description of the use of the game.

INSTRUCTIONS FOR THE YOUNGER AGES

Punch out the markers to be used in playing Ircle Circle. The goal of each player (2, 3 or 4 may play) is to get his markers into play, one at a time, as his turns occur. The Ircle Circle board displays a variety of word parts (prefixes, suffixes, roots), each word part representing one space. The players, directed by the color and number value of their spins, combine word parts by moving markers onto them to build correctly spelled words of at least two parts. Points are awarded on the basis of point values on all markers covering word parts which correctly build the completed word. There can be no repetition of a complete word in the course of the game. Both words and scores should be recorded on paper.

RULE 1 Each player places his 8 markers at the START positions. Each player spins the spinner; the highest score is the first player. If more than 2 players, play moves to the left. Spins tell the color of the circle and the number of spaces to be moved.

RULE 2 Players take turns spinning the spinner and move their markers onto the indicated colored circle the indicated number of spaces. Markers may enter the circles to the left or right, and when in play, may move to the left or right. The white "spokes" are never considered as spaces. A player may use his turn either to start a marker or move one already in play. Word parts may be occupied in any order (not necessarily in the order the word is spelled).

RULE 3 If a player has 2 markers already in play on the circle indicated by the spin, he may split the number of spaces between the two markers. For example, a blue 5 occurs —one marker on the blue circle is moved 3 spaces, the other 2 spaces. In this action a player's markers may occupy an opponent's space but may not capture an opponent's marker(s). To capture an opponent's marker(s) a player must move one marker the full number of spaces indicated by the player's spin and must land on the space occupied by marker(s) of opponent(s). Upon capturing of an opponent's marker(s), marker(s) is put out of play.

RULE 4 When a player thinks his markers cover word parts which correctly build a word of at least 2 parts he may claim that word only during the time of his own turns. If he has built a correctly spelled word, he gets the point score for all the markers involved in building that word. Markers, after building a word, may be moved on to other word parts on a player's following spins.

RULE 5 If a word is claimed and an opponent challenges its validity or spelling, the challenged player must prove his claim by use of a dictionary, which is used during the game for such challenges only. If the challenger is correct, he receives the points for the markers involved; and the player who claimed the word deducts from his score the points for the markers involved. If the challenger is wrong, he deducts the points for the markers involved from his score. All deductions from scores must be made in full, even if they create a minus total.

RULE 6 All words in a standard dictionary may be used except: foreign words, abbreviations, proper nouns and pronouns, and words involving apostrophes.

RULE 7 If a player can build more than one complete word on a single turn, he receives point credit for all the words, even though certain word parts are used at the same time for different words. Example: A player has occupied "CEPT," "TENT" and "ION." By then occupying "IN" he builds, on the same turn, "INCEPTION" and "INTENTION."

RULE 8 If a player's claimed word repeats word part(s) of his own immediately previous word, he receives point credit only for the unrepeated word part(s). Example: "INCEPTION"-"INTENTION" (point credit for "TENT" only).

RULE 9 Certain words drop the letter preceding the added suffix. Example: "DISPOSABLE." Player, in claiming such a word, must indicate spelling.

RULE 10 Condition(s) for *Double Credit* in playing on one's own word:
1. An additional word part(s), NOT in the player's possession at time the word was claimed, can be added to the original word and must be a valid extension of the word. Example: "PROGRESS" to "PROGRESSIVE."

INSTRUCTIONS FOR THE YOUNGER AGES – Continued

2. Application of additional word part(s) must be made on the same turn, when marker(s) lands on it (them).
3. Markers must still cover all the letters of one's successfully claimed original word.
4. Player receives double credit for additional word part(s) only.
5. Player, if able, may add a further additional word part, once again for double credit.

RULE 11 Conditions for *Triple Credit* in playing on one's opponent's word:
1. An additional word parts, which may be in player's possession at the time the word was claimed, can be added to the original word and must be a valid extension of the word.
2. Application of additional word parts may be made on any of player's turns, with condition no. 3 still prevailing.
3. Markers must still cover all word parts of opponent's successfully claimed word.
4. Player receives triple credit for additional word parts only.
5. A player may add additional word parts to a given word of an opponent only one time.

RULE 12 The winner is determined in either one of two ways: (a) the player who first scores 100 points or (b) the player who has the most points and succeeds in capturing the required number of opponent's markers—if 2 play, 4 markers; if 3 play, 3 markers from each; if 4 play, 2 markers from each.

INSTRUCTIONS FOR ADULTS

Punch out the markers to be used in playing Ircle Circle. The goal of each player (2, 3 or 4 may play) is to get his markers into play, one at a time, as his turns occur. The Ircle Circle board displays a variety of letters, each letter representing one space. The players, directed by the color and number value of their spins, combine letters by moving markers onto them to build correctly spelled words of at least three letters. Points are awarded on the basis of point values given each letter which correctly spells the completed word. There can be no repetition of a complete word in the course of the game. Both words and scores should be recorded on paper.

RULE 1 Each player places his 8 markers at the START position. Each player spins the spinner; the highest score is the first player. If more than 2 players, play moves to the left. Spins tell the color of the circle and the number of spaces to be moved.

RULE 2 Players takes turns spinning the spinner and move their markers onto the indicated colored circle the indicated number of spaces. Markers may enter the circles to the left or right, and when in play, may move to the left or right. The white "spokes" are never considered as spaces. A player may use his turn either to start a marker or move one already in play. Letters may be occupied in any order (not necessarily in the order the word is spelled.)

RULE 3 If a player has 2 markers already in play on the circle indicated by the spin, he may split the number of spaces between the two markers. For example, a blue 5 occurs —one marker on the blue circle is moved 3 spaces, the other 2 spaces. In this action a player's markers may occupy an opponent's space but may not capture an opponent's marker(s). To capture an opponent's marker(s) a player must move one marker the full number of spaces indicated by the player's spin and must land on the space occupied by marker(s) of opponent(s). Upon capturing of an opponent's marker(s), marker(s) is put out of play.

RULE 4 When a player thinks his markers cover letters which correctly spell a word of at least 3 letters, he may claim that word only during the time of his own turns. If he has formed a correctly spelled word, he gets the point score for all the letters involved in spelling that word. Markers, after spelling a word, may be moved on to other letters on a player's following spins.

RULE 5 If a word is claimed and an opponent challenges its validity or spelling, the challenged player must prove his claim by use of a dictionary, which is used during the game for such challenges only. If the challenger is correct, he receives the points for the letters involved; and the player who claimed the word deducts from his score the points for the letters involved. If the challenger is wrong, he deducts the points for the letters involved from his score. All deductions from scores must be made in full, even if they create a minus total.

RULE 6 All words in a standard dictionary may be used except: foreign words, abbreviations, proper nouns and pronouns, and words involving apostrophes.

RULE 7 When a player claims a word, he may claim additional words by rearranging ALL the letters involved. For example, EAR—"ARE," "ERA." Player receives total point credit for all words.

RULE 8 The winner is determined in either one of two ways: (a) the player who first scores 100 points or (b) the player who has the most points and succeeds in capturing the required number of opponent's markers—if 2 play, 4 markers; if 3 play, 3 markers from each; if 4 play, 2 markers from each.

INSTRUCTIONS FOR ADULTS – (continued)

ADDITIONAL ADULT GAME INSTRUCTIONS FOR A VARIETY OF PLAY

1. Conditions for *Double Credit* in playing one's own word:
   1. An additional letter(s), NOT in the player's possession at time the word was claimed, can be added to the original word and must create an entirely new word. Examples: "ALL" to "HALL," "BALE" to "TABLE" to "BATTLE." Non Examples: "BOOK" to "BOOKS," "BUY" to "BUYS," "KIND" to "KINDER."
   2. Application of additional letter(s) must be made on the same turn, when marker(s) land on them.
   3. Markers must still cover all the letters of one's successfully claimed original word.
   4. Player receives double credit for additional letter(s) only.
   5. Player, if able, may add a further additional letter, once again for double credit.

2. Conditions for *Triple Credit* in playing on one's opponent's word:
   1. An additional letter(s), which may be in player's possession at the time the word was claimed can be added to the original word and must create an entirely new word.
   2. Application of additional letter(s) may be made on any of player's turns, with condition no. 3 still prevailing.
   3. Markers must still cover all letters of opponent's successfully claimed word.
   4. Player receives triple credit for additional letter(s) only.
   5. A player may add additional letter(s) to a given word of an opponent only one time.

3. If a player's claimed word repeats letter(s) of his own immediately previous word, built on an earlier turn, he receives point credit only for the unrepeated letter(s). Example: "COG" to "LOG," credit for letter (L) only.

I claim:
1. An educational game apparatus comprising a board,
the board having a plurality of playing paths individually identified by different colors and disposed in a circular arrangement around a common axis,
each playing path including linearly successive spaces, and each of the spaces including a portion of a word,
an indicating path concentric with said common axis and including areas of the same colors as the playing paths, each area including a plurality of spaces bearing indications of numbers of steps of progress of plays along the playing paths,
a plurality of markers constituting individual pieces movable along the playing paths, and an indicator movable relative to the indicating areas and cooperating therewith for indicating various ones of the playing paths and various ones of the numbers of steps.

2. A game apparatus according to claim 1 wherein the word portions are in the form of syllables or groups of letters.

3. A game apparatus according to claim 1 wherein the word portions are in the form of individual letters.

4. A game apparatus according to claim 1 wherein the markers are incorporated in and constitute a portion of the board, and the board is scored to facilitate removal of the markers from the remainder of the board.

5. A game apparatus according to claim 1 wherein the markers are separate from the board.

6. A game apparatus according to claim 1 wherein the playing paths are in a circular main playing area divided into a plurality of wedge-shaped areas by radial spokes of neutral color, and the board includes playing indications at the outer ends of the spokes designating the starting positions of the various players.

7. A game apparatus according to claim 1 wherein the playing paths are in a circular main playing area divided into a plurality of wedge-shaped areas by radial spokes of neutral color, and the indicating path areas are disposed adjacent respective ones of the wedge-shaped areas, and the spaces of each indicating path area are of the same color.

* * * * *